(12) United States Patent
Dorjgotov et al.

(10) Patent No.: US 10,108,049 B2
(45) Date of Patent: Oct. 23, 2018

(54) GRAY SCALE INVERSION REDUCTION OR PREVENTION IN LIQUID CRYSTAL DISPLAYS

(75) Inventors: EnkhAmgalan Dorjgotov, Cupertino, CA (US); Zhibing Ge, Sunnyvale, CA (US); Ming Xu, Cupertino, CA (US); Cheng Chen, Cupertino, CA (US); Young Bae Park, San Jose, CA (US); John Z. Zhong, Cupertino, CA (US); Wei Chen, Palo Alto, CA (US); Shawn Robert Gettemy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1429 days.

(21) Appl. No.: 12/794,623

(22) Filed: Jun. 4, 2010

(65) Prior Publication Data
US 2011/0298833 A1    Dec. 8, 2011

(51) Int. Cl.
*G09G 3/36*    (2006.01)
*G02F 1/1337*    (2006.01)

(52) U.S. Cl.
CPC ............... *G02F 1/133784* (2013.01); *G02F 2001/133776* (2013.01)

(58) Field of Classification Search
USPC .................................................. 345/87–104
See application file for complete search history.

(56) References Cited

U.S. PATENT DOCUMENTS

| 6,493,054 B2 | 12/2002 | Mizunuma et al. |
| 6,987,499 B2 | 1/2006 | Yamaguchi et al. |
| 7,002,537 B1 | 2/2006 | Ito |
| 7,038,402 B1 | 5/2006 | Adler et al. |

(Continued)

FOREIGN PATENT DOCUMENTS

| CN | 1322340 A1 | 11/2001 |
| CN | 101038411 A1 | 9/2007 |

(Continued)

OTHER PUBLICATIONS

International Search Report and Written Opinion for PCT Application No. PCT/US2010/948513 dated Jun. 29, 2011, 18 pgs.

(Continued)

*Primary Examiner* — Sanghyuk Park
(74) *Attorney, Agent, or Firm* — Fletcher Yoder PC

(57) ABSTRACT

Devices and methods related to high-contrast liquid crystal displays (LCDs) are provided. For example, such an electronic device may include an LCD with two liquid crystal alignment layers not symmetric to one another and upper and lower polarizing layers respectively above and below the alignment layers. Light transmittance through the plurality of pixels may increase monotonically with gray scale voltage. The display may operate using a gray scale level 0 voltage higher than a minimum gray scale level 0 voltage capability of the display. Additionally or alternatively, liquid crystal molecular alignment axes of the two alignment layers may be offset from one another by an angle other than a multiple of 180 degrees. Additionally or alternatively, a first polarizing axis of the upper polarizing layer or a second polarizing axis of the lower polarizing layer, or both, may be neither parallel nor perpendicular to one of the liquid crystal molecular alignment axes.

19 Claims, 9 Drawing Sheets

(56) References Cited

U.S. PATENT DOCUMENTS

| | | |
|---|---|---|
| 7,095,394 B2 | 8/2006 | Hong |
| 7,202,928 B2 | 4/2007 | Lee et al. |
| 7,205,970 B2 | 4/2007 | Kim et al. |
| 7,397,527 B2 | 7/2008 | Lin |
| 7,590,299 B2 | 9/2009 | Brown Elliott et al. |
| 7,626,667 B2 | 12/2009 | Lee et al. |
| 7,728,616 B2 | 6/2010 | Park et al. |
| 7,804,567 B2 | 9/2010 | Ikeno et al. |
| 8,102,493 B2 | 1/2012 | Li et al. |
| 8,269,934 B2 | 9/2012 | Jin et al. |
| 8,514,158 B2 | 8/2013 | Kimura |
| 2003/0058211 A1 | 3/2003 | Kim et al. |
| 2003/0193636 A1* | 10/2003 | Allen et al. ............ 349/117 |
| 2005/0179623 A1 | 8/2005 | Negoi |
| 2006/0050216 A1 | 3/2006 | Joten |
| 2006/0061710 A1* | 3/2006 | Lin .................... 349/99 |
| 2006/0103795 A1* | 5/2006 | Ikeno et al. ............ 349/117 |
| 2006/0103800 A1 | 5/2006 | Li et al. |
| 2006/0114389 A1 | 6/2006 | Lin |
| 2006/0284898 A1 | 12/2006 | Shen et al. |
| 2007/0121048 A1* | 5/2007 | Hsu et al. ............ 349/143 |
| 2008/0088560 A1* | 4/2008 | Bae et al. ............ 345/90 |
| 2008/0143930 A1 | 6/2008 | Jim et al. |
| 2008/0204647 A1* | 8/2008 | Matsui ............ 349/128 |
| 2010/0073339 A1 | 3/2010 | Lee et al. |
| 2012/0057117 A1 | 3/2012 | Li et al. |

FOREIGN PATENT DOCUMENTS

| | | |
|---|---|---|
| CN | 101251685 A | 8/2008 |
| JP | H07-261152 A | 10/1995 |
| JP | H11-038425 A | 2/1999 |
| JP | 2001-290152 A | 10/2001 |
| JP | 2003015612 A | 1/2003 |
| JP | 4558263 B2 | 4/2003 |
| JP | 2006-094328 A | 4/2006 |
| JP | 2006-145675 A | 6/2006 |
| JP | 2007-093655 A | 4/2007 |
| JP | 2009-171192 A | 7/2009 |
| JP | 2009265114 A | 11/2009 |
| KR | 10-2003-0020153 A | 3/2003 |
| KR | 1020050037243 A | 4/2004 |
| KR | 10-2006-0052245 A | 5/2006 |
| KR | 1020060051043 A | 5/2006 |
| KR | 10-2007-0016853 A | 2/2007 |
| KR | 1020070023986 A | 3/2007 |
| KR | 10-2008-0056403 A | 6/2008 |
| TW | 200728819 A | 8/2007 |

OTHER PUBLICATIONS

Korean Search Report for Application No. 10-2012-7025791 dated Oct. 11, 2012.
Partial International Search Report for PCT/US2010/049513 dated Mar. 10, 2011, 7 pgs.
Chinese Office Action for Chinese Application No. 201010552372.7 dated Oct. 9, 2013; 7 pgs.
Chinese Office Action for Chinese Application No. 201010552372.7 dated Feb. 28, 2013; 4 pgs.
Korean Office Action for Korean Application No. 10-2012-7025791 dated Feb. 28, 2013; 6 pgs.
Korean Office Action for Korean Appiicaton No. 10-2012-7025791 dated Nov. 4, 2013; 7pgs.
Japanese Office Action for Japanese Application No. 2013-511139 dated Dec. 20, 2013; 5 pgs.

* cited by examiner

GRAY SCALE INVERSION REDUCTION OR PREVENTION IN LIQUID CRYSTAL DISPLAYS

BACKGROUND

The present disclosure relates generally to liquid crystal display (LCD) panels and, more particularly, to high-contrast LCD panels.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts were it is desirable to minimize power usage.

LCD devices typically include a plurality of picture elements (pixels) arranged in a matrix to display an image. Individual pixels of an LCD device may variably permit light to pass when an electric field is applied to a liquid crystal material in each pixel. This electric field may be generated by a voltage difference between a pixel electrode and a common electrode. The voltage that is applied to the pixel electrode that causes the pixel to transmit the least amount of light may be referred to as a gray scale level 0 voltage (G0). As gray scale level voltages increase beyond G0, the liquid crystal material should gradually allow more light to pass through the pixel. In some cases, however, as the gray scale level voltages increase beyond G0, the amount of light passing through the pixel may at first decrease, in a condition known as gray scale inversion or gray inversion. The condition of gray inversion in LCD panels may reduce contrast and produce image artifacts at low gray scale voltage levels.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods related to high-contrast liquid crystal displays (LCDs). For example, such an electronic device may include an LCD with two liquid crystal alignment layers not symmetric to one another and upper and lower polarizing layers respectively above and below the alignment layers. Light transmittance through the plurality of pixels may increase monotonically with gray scale voltage. The display may operate using a gray scale level 0 voltage higher than a minimum gray scale level 0 voltage capability of the display. Additionally or alternatively, liquid crystal molecular alignment axes of the two alignment layers may be offset from one another by an angle other than a multiple of 180 degrees. Additionally or alternatively, a first polarizing axis of the upper polarizing layer or a second polarizing axis of the lower polarizing layer, or both, may be neither parallel nor perpendicular to one of the liquid crystal molecular alignment axes.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
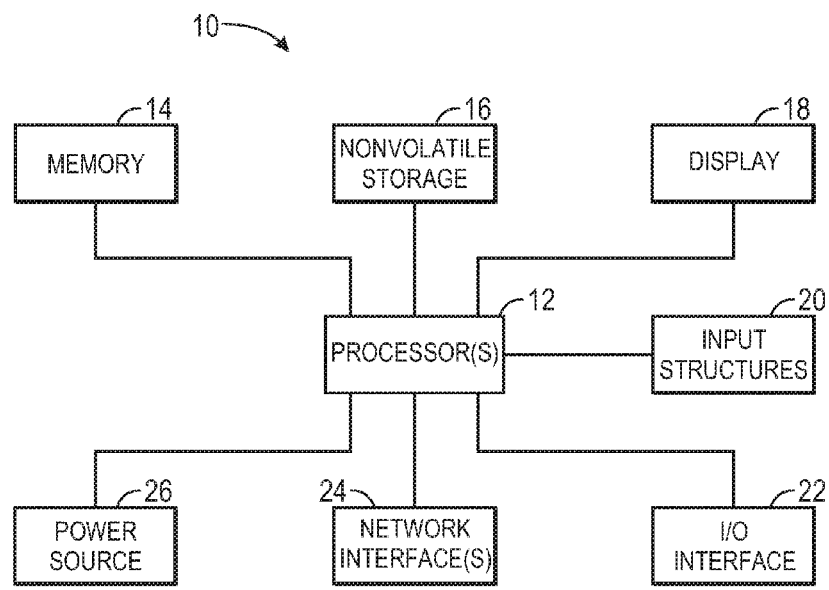
FIG. 1 is a block diagram of exemplary components of an electronic device, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to a high-contrast liquid crystal display (LCD) panel. In particular, the development, production, and/or use of such a high-contrast LCD panel may include setting a gray level zero (G0) of the LCD panel to a voltage that causes a transmittance minimum. Additionally or alternatively, the axis of a top or bottom polarizing layer may be offset from a liquid crystal molecular alignment axis of one or both alignment layers of the LCD panel, rather than be parallel or perpendicular to the liquid crystal molecular alignment axis. The term "liquid crystal molecular alignment axis" may also be referred to as a "rubbing axis" or "director axis" and, as used herein, generally refers to an angle that an alignment layer would cause liquid crystal molecules to align with if the alignment layer were planar, in the absence of an electric field. In some embodiments, the top and bottom liquid crystal molecular alignment axes of the liquid crystal alignment layers even may be offset from one another to cause the liquid crystal director to more effectively exclude light at low gray level voltages. These embodiments, alone or in combination, may cause pixels of the LCD panel to monotonically increase (e.g., to increase without decreasing) light transmittance as gray level voltages increase, reducing gray inversion (e.g., when low gray scale level voltages cause greater transmittance than higher gray scale level voltages) as well as enhancing on-axis contrast.

As discussed below, it is believed that these embodiments enable a high contrast ratio by accounting for distortion caused by the non-planarity of liquid crystal alignment layers in certain modern LCD panels. This non-planarity may arise when pixel electrodes occupy space beneath one or more of the alignment layers, causing the alignment layers to protrude into space occupied by liquid crystal material. Pixel electrodes may commonly occupy such space in certain in-plane switching/fringe-field switching (IPS/FFS) LCD panels, as may common electrodes for certain other LCD panels.

Typically, high contrast may be achieved when the axes of polarizing layers above and below the pixels are respectively perpendicular and parallel to a liquid crystal molecular alignment axis of an LCD panel or parallel and perpendicular to the liquid crystal molecular alignment axis of an LCD panel, depending on the mode of operation of the LCD panel. However, it is believed that the non-planarity of the alignment layers in certain LCD panels may produce distortion of the liquid crystal material near the site of the protrusions when the top and bottom polarizer axes are perpendicular or parallel to the liquid crystal molecular alignment axis of an LCD panel. This distortion is believed to induce retardation for light polarized along or perpendicular to the liquid crystal molecular alignment axis direction, resulting in significant light leakage in the dark state for on-axis light, which may effectively reduce the contrast ratio of the LCD panel if not corrected.

To account for these light leakage artifacts, some embodiments involve performing certain gamma correction to ensure the transmittance of the panel increases monotonically with gray level voltages. These embodiments may involve, for example, determining a voltage that produces a minimum transmittance, and setting the gray level 0 (G0) voltage equal to that minimum transmittance voltage. The embodiments also may involve first selecting default gamma settings and testing certain low gray voltage levels (e.g., G0, G3, and G7) for a gray inversion condition. If a gray inversion condition is detected, a new gamma setting may be selected and the LCD panel again tested for gray inversion at the low gray voltage levels. This pattern may repeat until gray inversion is no longer detected, which may imply that the gray scale level 0 voltage (G0) is near the transmittance minimum of the LCD panel. When the gray scale level 0 voltage (G0) is near the transmittance minimum of the LCD panel, the contrast of the LCD display generally may reach a maximum.

Alternatively or in addition to techniques for selecting the gamma settings of the LCD panel, the LCD panel may be designed such that a top or bottom polarizer axis is offset from the liquid crystal molecular alignment axis of an alignment layer of the LCD panel. It is believed that my offsetting the polarizer axes from the liquid crystal molecular alignment axis, slight distortion caused by the protrusion of the pixel electrodes or common electrodes into the liquid crystal material may be corrected. Similarly, in some embodiments, the liquid crystal molecular alignment axis of the upper alignment layer may be different from the liquid crystal molecular alignment axis of the lower alignment layer. It is believed that offsetting the respective liquid crystal molecular alignment axes of the top and bottom alignment layers may result in a similar correction of the distortion of the LCD panel. Offsetting the polarizer axes and/or liquid crystal molecular alignment axes in the manner described herein is expected to produce a substantially monotonic function of transmittance in relation to gray level voltages.

With the foregoing in mind, FIG. 1 represents a block diagram of an electronic device 10 employing such a high-contrast display 18. Among other things, the electronic device 10 may include processor(s) 12, memory 14, nonvolatile storage 16, the display 18, input structures 20, an input/output (I/O) interface 22, network interface(s) 24, and/or a power source 26. In alternative embodiments, the electronic device 10 may include more or fewer components. The various functional blocks shown in FIG. 1 may include hardware elements (including circuitry), software elements (including computer code stored on a computer-readable medium) or a combination of both hardware and software elements. It should further be noted that FIG. 1 is merely one example of a particular implementation and is intended to illustrate the types of components that may be present in the electronic device 8

In general, the processor(s) 12 may govern the operation of the electronic device 10. In some embodiments, based on instructions loaded into the memory 14 from the nonvolatile storage 16, the processor(s) 12 may respond to user touch gestures input via the display 18. In addition to these instructions, the nonvolatile storage 16 also may store a variety of data. By way of example, the nonvolatile storage 16 may include a hard disk drive and/or solid state storage, such as Flash memory.

The display 18 may be a high-contrast liquid crystal display (LCD), such as provided herein. In particular, despite the non-planar nature of the alignment layers in the display 18, the display 18 may not exhibit or may exhibit less gray scale inversion at low gray level voltages and/or may exhibit high on-axis contrast based on the techniques provided herein. The display 18 also may represent one of the input structures 20. Other input structures 20 may include, for example, keys, buttons, and/or switches. The I/O ports 22 of the electronic device 10 may enable the electronic device 10 to transmit data to and receive data from other electronic devices 10 and/or various peripheral devices, such as external keyboards or mice. The network interface(s) 24 may enable personal area network (PAN) integration (e.g., Bluetooth), local area network (LAN) integration (e.g., Wi-Fi), and/or wide area network (WAN) integration (e.g., cellular 3G or 4G). The power source 26 of the electronic device 10 may be any suitable source of power, such as a rechargeable lithium polymer (Li-poly) battery and/or alternating current (AC) power converter.

Figure 2:
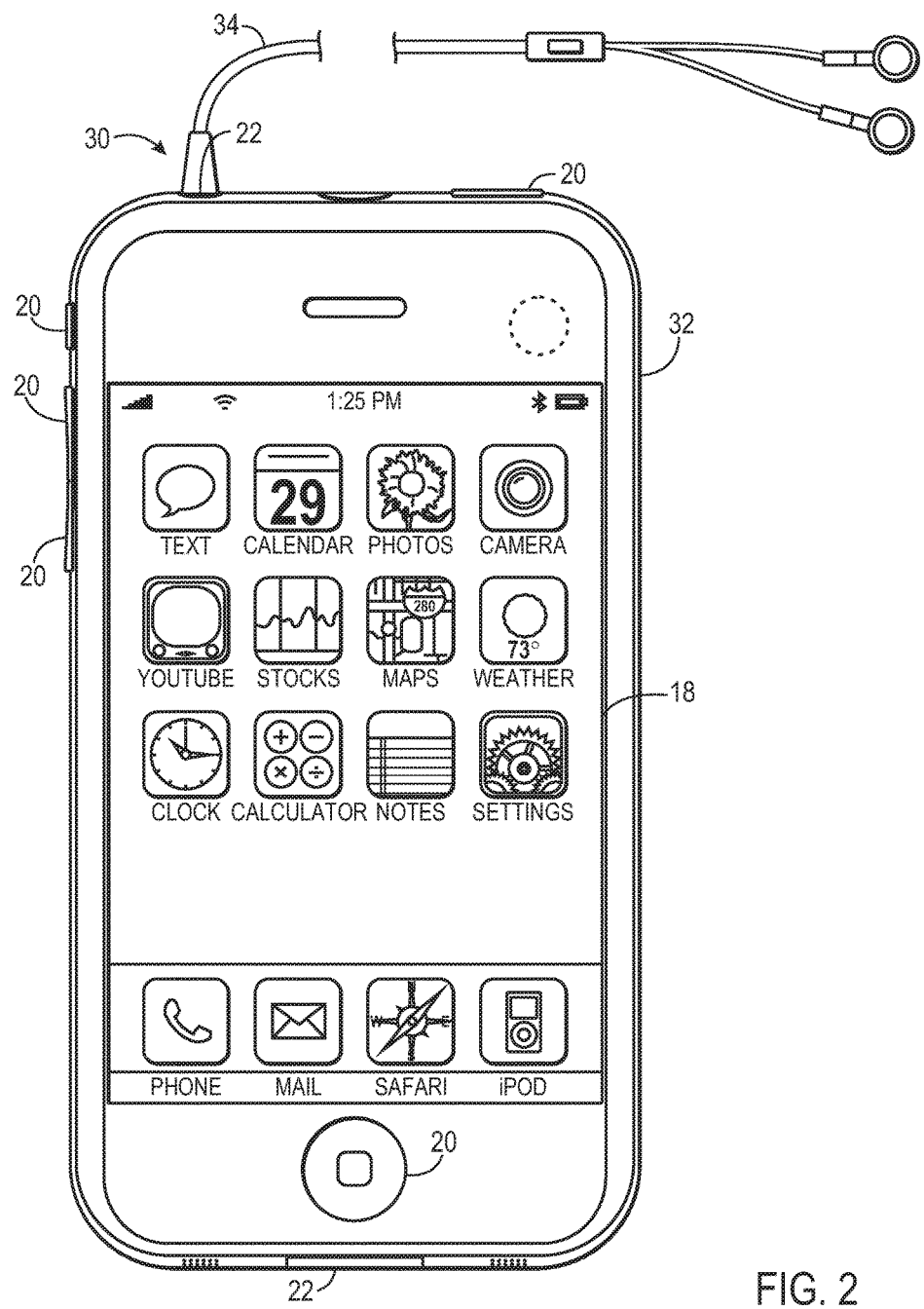
FIG. 2 is a front view of a handheld electronic device in accordance with aspects of the present disclosure.

FIG. 2 illustrates an electronic device 10 in the form of a handheld device 30, here a cellular telephone. It should be noted that while the handheld device 30 is provided in the context of a cellular telephone, other types of handheld devices (such as media players for playing music and/or video, personal data organizers, handheld game platforms, and/or combinations of such devices) may also be suitably provided as the electronic device 10. Further, the handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld device 30 also may communicate with other devices using short-range connections, such as Bluetooth and/or near field communication (NFC). By way of example, the handheld device 30 may be a model of an iPod® or iPhone® available from Apple Inc. of Cupertino, Calif.

The handheld device 30 may include an enclosure 32 or body that protects the interior components from physical damage and shields them from electromagnetic interference. The enclosure 32 may be formed from any suitable material, such as plastic, metal or a composite material, and may allow certain frequencies of electromagnetic radiation to pass through to wireless communication circuitry within handheld device 30 to facilitate wireless communication. The enclosure 32 may also include user input structures 20 through which a user may interface with the device. Each user input structure 20 may be configured to help control a device function when actuated. For example, in a cellular telephone implementation, one or more input structures 20 may be configured to invoke a "home" screen or menu to be displayed, to toggle between a sleep and a wake mode, to silence a ringer for a cell phone application, to increase or decrease a volume output, and so forth.

The display 18 may display a graphical user interface (GUI) that allows a user to interact with the handheld device 30. Icons of the GUI may be selected via a touch screen included in the display 18, or may be selected by one or more input structures 20, such as a wheel or button. The handheld device 30 also may include various I/O ports 22 that allow connection of the handheld device 30 to external devices. For example, one I/O port 22 may be a port that allows the transmission and reception of data or commands between the handheld device 30 and another electronic device, such as a computer. Such an I/O port 22 may be a proprietary port from Apple Inc. or may be an open standard I/O port. Another I/O port 22 may include a headphone jack to allow a headset 34 to connect to the handheld device 30.

Figure 3:
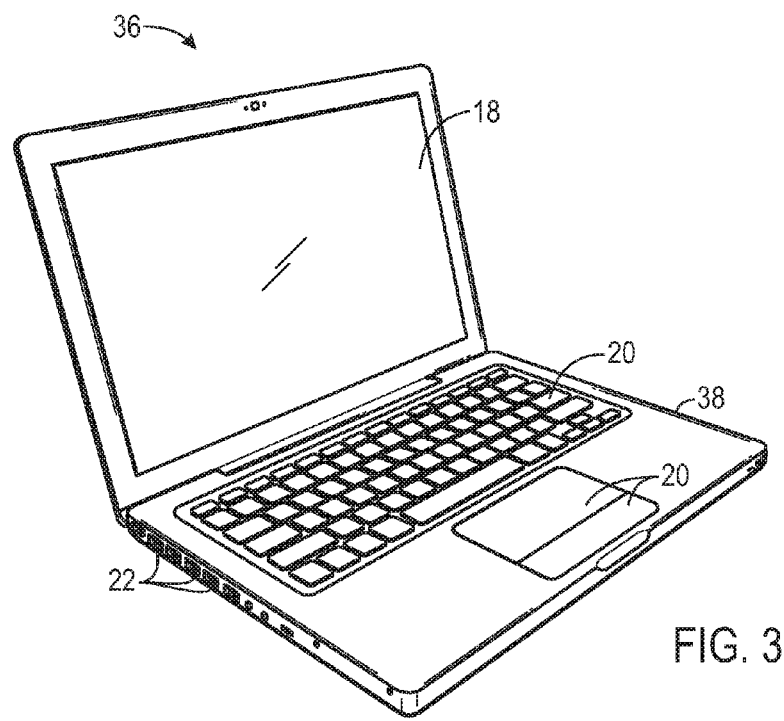
FIG. 3 is a view of a computer in accordance with aspects of the present disclosure.

In addition to the handheld device 30 of FIG. 2, the electronic device 10 may also take the form of a computer or other type of electronic device. Such a computer may include a computer that is generally portable (such as a laptop, notebook, and/or tablet computer) and/or a computer that is generally used in one place (such as a conventional desktop computer, workstation and/or servers). In certain embodiments, the electronic device 10 in the form of a computer may be a model of a MacBook®, MacBook® Pro, MacBook Air®, iMac®, Mac® mini, or Mac Pro® available from Apple Inc. In another embodiment, the electronic device 10 may be a tablet computing device, such as an iPad® available from Apple Inc. By way of example, a laptop computer 36 is illustrated in FIG. 3 and represents an embodiment of the electronic device 10 in accordance with one embodiment of the present disclosure. Among other things, the computer 36 includes a housing 38, a display 18, input structures 20, and I/O ports 22.

In one embodiment, the input structures 22 (such as a keyboard and/or touchpad) may enable interaction with the computer 36, such as to start, control, or operate a GUI or applications running on the computer 36. For example, a keyboard and/or touchpad may allow a user to navigate a user interface or application interface displayed on the display 18. Also as depicted, the computer 36 may also include various I/O ports 22 to allow connection of additional devices. For example, the computer 36 may include one or more I/O ports 22, such as a USB port or other port, suitable for connecting to another electronic device, a projector, a supplemental display, and so forth. In addition, the computer 36 may include network connectivity, memory, and storage capabilities, as described with respect to FIG. 1.

Figure 4:
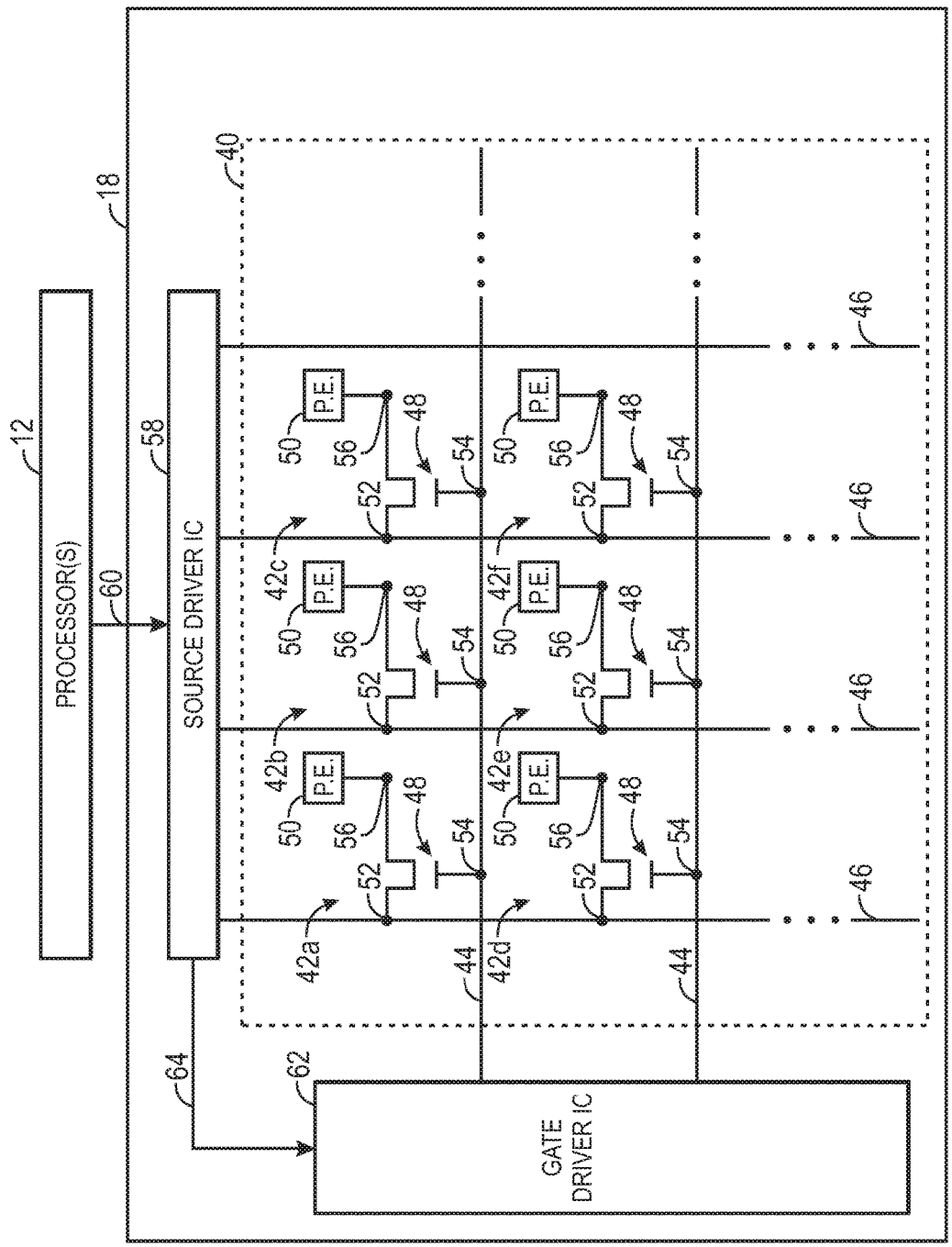
FIG. 4 is a circuit diagram of switching and display circuitry of LCD pixels, in accordance with aspects of the present disclosure.

As noted briefly above, the display 18 represented in the embodiments of FIGS. 1-3 may be a liquid crystal display (LCD). FIG. 4 represents a circuit diagram of such a display 18, in accordance with an embodiment. As shown, the display 18 may include an LCD display panel 40 including unit pixels 42 disposed in a pixel array or matrix. In such an array, each unit pixel 42 may be defined by the intersection of rows and columns, represented here by the illustrated gate lines 44 (also referred to as "scanning lines") and source lines 46 (also referred to as "data lines"), respectively. Only six unit pixels 42a-42f are shown for purposes of simplicity. However, it should be understood that in an actual implementation, each source line 46 and gate line 44 may include thousands of such unit pixels 42.

As shown in the present embodiment, each unit pixel 42 includes a thin film transistor (TFT) 48 for switching a data signal stored on a respective pixel electrode 50. In the depicted embodiment, a source 52 of each TFT 48 may be electrically connected to a source line 46 and a gate 54 of each TFT 48 may be electrically connected to a gate line 44. A drain 56 of each TFT 48 may be electrically connected to a respective pixel electrode 50. Each TFT 48 serves as a switching element which may be activated and deactivated (e.g., turned on and off) for a predetermined period based upon the respective presence or absence of a scanning signal at the gate 54 of the TFT 48.

When activated, the TFT 48 may store the image signals received via a respective source line 46 as a charge upon its corresponding pixel electrode 50. The image signals stored by the pixel electrode 50 may be used to generate an electrical field between the respective pixel electrode 50 and a common electrode (not shown in FIG. 5). The electrical field between the respective pixel electrode 50 and the common electrode may alter the polarity of a liquid crystal layer above the unit pixel 42. The electrical field may align liquid crystals molecules within the liquid crystal layer to modulate light transmission. As the electrical field changes, the amount of light may increase or decrease. In general, light may pass through the unit pixel 42 at an intensity corresponding to the applied voltage (e.g., from a corresponding source line 46). As will be discussed below, however, an asymmetry between top and bottom liquid crystal alignment layers is believed to cause some distortion that may adversely impact this relationship between the voltage of the pixel electrode 50 and the transmittance of the pixel 42.

The display 18 also may include a source driver integrated circuit (IC) 58, which may include a chip, such as a processor or ASIC, that controls the display panel 40 by receiving image data 60 from the processor(s) 12 and sending corresponding image signals to the unit pixels 42 of the panel 40. The source driver IC 58 also may couple to a gate driver IC 62 that may activate or deactivate rows of unit pixels 42 via the gate lines 44. As such, the source driver IC 58 may send timing information, shown here by reference number 64, to gate driver IC 62 to facilitate activation/deactivation of individual rows of pixels 42. In other embodiments, timing information may be provided to the gate driver IC 62 in some other manner.

In operation, the source driver IC 58 receives the image data 60 from the processor(s) 12 or a separate display controller and, based on the received data, outputs signals to control the pixels 42. For instance, to display image data 60, the source driver IC 58 may adjust the voltage of the pixel electrodes 50 one row at a time. To access an individual row of pixels 42, the gate driver IC 62 may send an activation signal (e.g., an activation voltage) to the TFTs 48 associated with the row of pixels 42, rendering the TFTs 48 of the addressed row conductive. The source driver IC 58 may transmit certain data signals to the unit pixels 42 of the addressed row via respective source lines 46. Thereafter, the gate driver IC 62 may deactivate the TFTs 48 in the addressed row by applying a deactivation signal (e.g., a lower voltage than the activation voltage, such as ground), thereby impeding the pixels 42 within that row from changing state until the next time they are addressed. The above-described process may be repeated for each row of pixels 42 in the panel 40 to reproduce image data 60 as a viewable image on the display 18.

Figure 5:
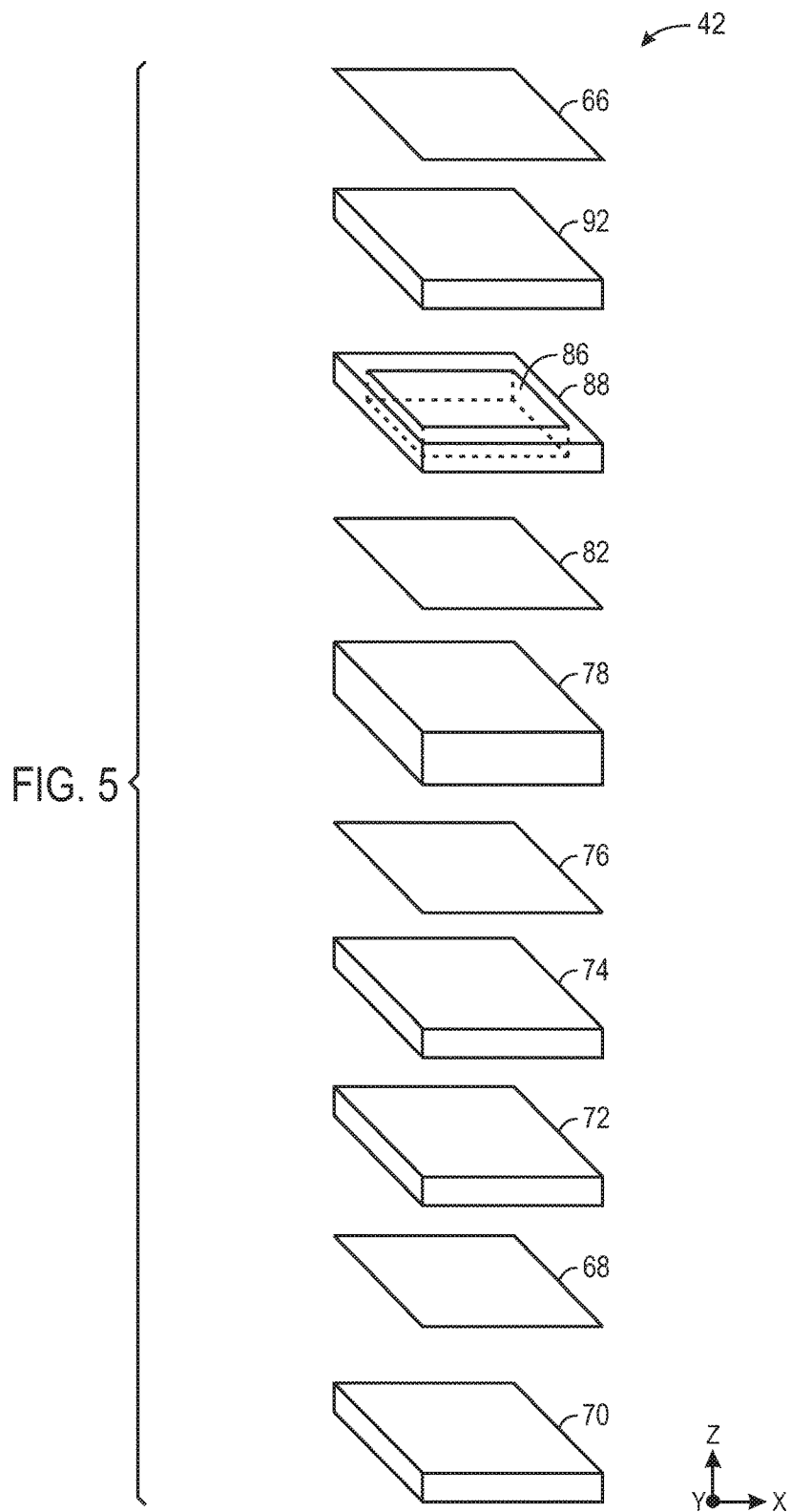
FIG. 5 is an exploded view of exemplary layers of a pixel of a liquid crystal display (LCD) panel, in accordance with aspects of the present disclosure.

The pixels 42 of the display 18 may include a number of layers, many of which are schematically illustrated in exploded view in FIG. 5. Each pixel 42 may include an upper polarizing layer 66 and a lower polarizing layer 68 to polarize light from a backlight assembly 70 or a light-reflective surface. A lower substrate 72 may be disposed above the polarizing layer 68 and is generally formed from a light-transparent material, such as glass, quartz, and/or plastic.

A thin film transistor (TFT) layer 74 is depicted as being disposed above the lower substrate 72. For simplicity of illustration, the TFT layer 74 is depicted as a generalized structure in FIG. 5. In practice, the TFT layer 74 may itself comprise various conductive, non-conductive, and semiconductive layers and structures which generally form the electrical devices and pathways which drive operation of the pixel 42. For example, in an embodiment in which the pixel 42 is part of an IPS/FFS LCD panel, the TFT layer 74 may include the respective data lines, scanning lines, pixel electrodes, and common electrodes (as well as other conductive traces and structures) of the pixel 42. Such conductive structures may, in light-transmissive portions of the pixel, be formed using transparent conductive materials, such as indium tin oxide (ITO). In addition, the TFT layer 74 may include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel and common electrodes, a TFT, and the respective data and scanning lines used to operate the pixel 42, as discussed above with reference to FIG. 4.

A lower alignment layer 76 and an upper alignment layer 82 of polyimide (PI) or other suitable materials may generally align molecules of a liquid crystal layer 78 to their liquid crystal molecular alignment axes in the absence of an electric field. The liquid crystal molecular alignment axes of the lower alignment layer 76 and the upper alignment layer 82 may be formed in any suitable manner. For example, the liquid crystal molecular alignment axes may be formed by rubbing the lower alignment layer 76 and/or the upper alignment layer 82 with fiber cloth, using polarized ultraviolet (UV) light to generate photo alignment on the lower alignment layer 76 and/or the upper alignment layer 82, and/or using a lower alignment layer 76 and/or upper alignment layer 82 of obliquely deposited inorganic materials such as silicon oxide (SiOx) or diamond-like carbon.

In the presence of an electric field between the pixel electrode 50 and a common electrode, the liquid crystal particles of the liquid crystal layer 78 may be oriented or aligned in directions other than the liquid crystal molecular alignment axes. The orientation of the liquid crystal particles of the liquid crystal layer 78 may cause the light passing through the liquid crystal layer 78 to become polarized in a manner that allows the light to pass through the upper polarizing layer 66. Thus, modulating the electrical field applied to liquid crystal layer 78 may modulate the amount of light transmitted though the pixel 42.

The lower alignment layer 76 and the upper alignment layer 82 may not be perfectly symmetric. The asymmetry between the lower alignment layer 76 and the upper alignment layer 82 is believed to produce some distortion of the liquid crystal molecules, which may cause gray scale inversion at low voltages. To account for this asymmetry, in some embodiments, the gray scale level voltage 0 (G0) may be selected to be higher than a minimum device voltage, which may prevent gray scale inversion and increase contrast. Additionally or alternatively, in some embodiments, the axes of the polarizing layers 66 and 68 may not be exactly parallel or perpendicular to the liquid crystal molecular alignment axes of the lower alignment layer 76 and the upper alignment layer 82, but rather may be offset by an amount sufficient to reduce or eliminate gray scale inversion and increase contrast. In some embodiments, the liquid crystal molecular alignment axes of the lower alignment layer 76 and the upper alignment layer 82 may be offset from another by a certain amount sufficient to reduce or eliminate gray scale inversion and increase contrast.

An overlying color filter 86 may be a red, green, or blue filter, such that the pixel 42 corresponds to a primary color when light is transmitted from the backlight assembly 70 through liquid crystal layer 78. The color filter 86 may be surrounded by a light-opaque mask or matrix, e.g., a black mask 88, which may circumscribe the light-transmissive portion of the pixel 42. For example, in certain embodiments, the black mask 88 may be sized and shaped to define a light-transmissive aperture over the liquid crystal layer 78 and around the color filter 86 and to cover or mask portions of the pixel 42 that do not transmit light, such as the scanning line and data line driving circuitry, the TFT, and/or the periphery of the pixel 42. In the depicted embodiment, an upper substrate 92 may be disposed between the black mask 88 and color filter 86 and the polarizing layer 66. In such an embodiment, the upper substrate 92 may be formed from light-transmissive glass, quartz, and/or plastic.

Figure 6:
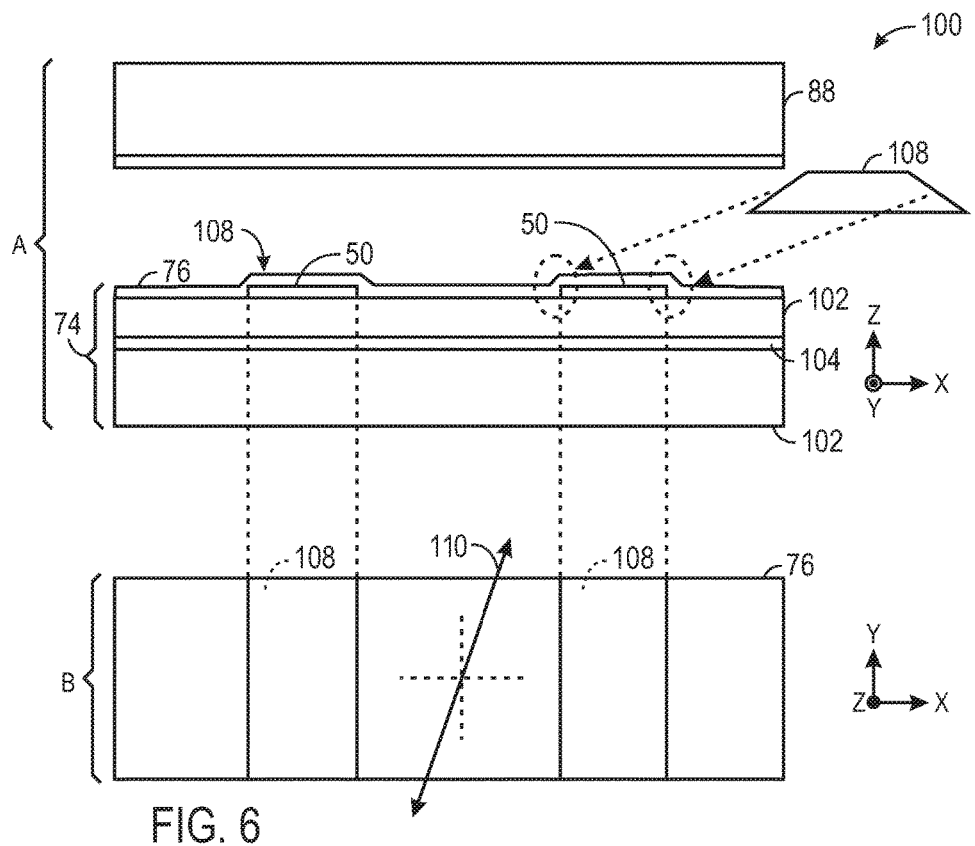
FIG. 6 is a schematic diagram of a portion of an LCD pixel, in accordance with aspects of the present disclosure.

As mentioned above, it is believed that were the surfaces of the lower alignment layer 76 and the upper alignment layer 82 both flat and/or symmetric, the least light transmittance of the pixel 42 should occur in the absence of an electric field and when the axes of the upper polarizing layer 66 and the lower polarizing layer 68 are parallel and perpendicular or perpendicular and parallel, respectively, to the liquid crystal molecular alignment axes of the lower alignment layer 76 and the upper alignment layer 82 (depending on the mode of operation of the display 18). However, as shown by a pixel selection 100 of FIG. 6, which represents a portion of a pixel 42, the lower alignment layer 76 and/or the upper alignment layer 82 may be neither symmetric nor flat.

The pixel selection 100 may represent a slice of a pixel 42 from the TFT layer 74 to the black mask layer 88. Specifically, FIG. 6 may illustrate both a side view A and a top view B of the pixel selection 100. As visible in the side view A of FIG. 6, the TFT layer 74 may include a glass substrate 102, a common electrode 104, and fingers of a pixel electrode 50. The fingers of the pixel electrode 50 may cause protrusions 108 of the lower alignment layer 76 into the liquid crystal material 78. As discussed below, these protrusions 108 and the resulting asymmetry between the lower alignment layer 76 and the upper alignment layer 82 are believed to impact the manner in which light is transmitted through the pixel 42.

A liquid crystal molecular alignment axis 110 of the lower alignment layer 76 and/or of the upper alignment layer 82 may generally align certain molecules of the liquid crystal layer 78. In some embodiments, the liquid crystal molecular alignment axis 110 of both the lower alignment layer 76 and the upper alignment layer 82 may be the same or offset from one another by 180°. In other embodiments, the liquid crystal molecular alignment axis 110 of the lower alignment layer 76 may be offset slightly from that of the upper alignment layer 82. Any suitable method may be used to determine the liquid crystal molecular alignment axis 110, which may be set, for example, at an angle of 83°. Depending on design constraints, the liquid crystal molecular alignment axis 110 may be at a different angle. The liquid crystal molecular alignment axis 110, also referred to herein as an alignment axis, may generally cause the liquid crystal molecules of the liquid crystal layer 78 to become aligned in the liquid crystal molecular alignment axis 110 direction.

However, it is believed that the actual alignment direction of these liquid crystal layer 78 molecules may not precisely match the liquid crystal molecular alignment axis 110 of a non-planar alignment layer, such as the lower alignment layer 76 having the protrusions 108. In particular, it is believed that the presence of the protrusions 108 into the liquid crystal material 78 may cause certain distortions near the pixel electrodes 106. A similar effect could be expected if other protrusions 108 were present in the display 18 as caused by other configurations (e.g., a common electrode 104 beneath the lower or upper alignment layers 76 or 82 and/or a pixel electrode 50 beneath the upper alignment layer 82).

Figure 7:
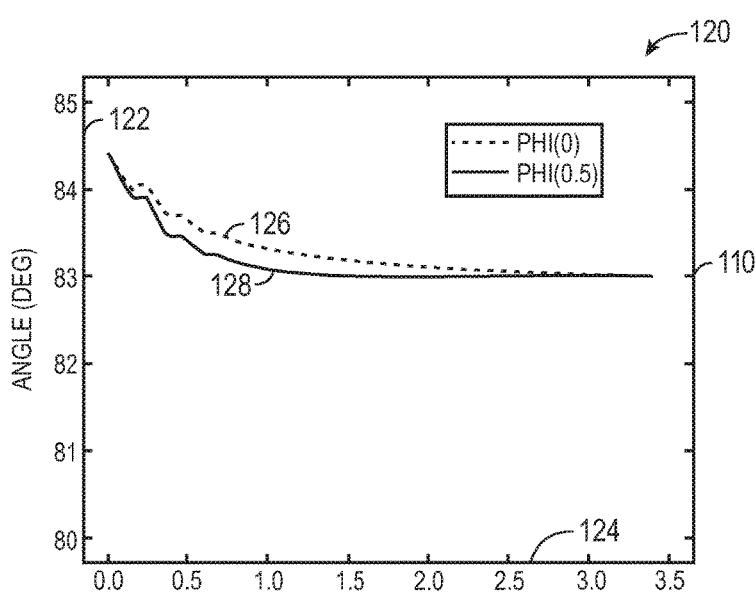
FIG. 7 is a plot modeling liquid crystal director distortion as a function of depth away from pixel electrodes in the pixel, in accordance with aspects of the present disclosure.

As modeled in a plot 120 of FIG. 7, it is believed that when the lower alignment layer 76 includes protrusions 108 due to the fingers of the pixel electrodes 50 but the upper alignment layer 82 remains planar, the liquid crystal director (unit vector alignment direction) of the liquid crystal layer 78 may deviate slightly from the liquid crystal molecular alignment axis 110 nearer to the site of the protrusions 108. In the plot 120, an ordinate 122 represents the liquid crystal director azimuthal angle in units of degrees, and an abscissa 124 represents depth of the liquid crystal material in units of micrometers (μm) from the lower alignment layer 76 to the upper alignment layer 82. From the plot 120, an azimuthal angle of the liquid crystal director within a pixel cavity may be seen to deviate more from the liquid crystal molecular alignment axis 110 angle at lower depths (nearer to the locations of the deviations 108) and to align more to the liquid crystal molecular alignment axis 110 at higher depths.

A curve 126 represents the azimuthal angle of the liquid crystal director of the liquid crystal layer 78 at a location along the x-direction of the pixel selection 100 at or near the pixel electrode 50 fingers. A curve 128 represents the azimuthal angle of the liquid crystal director of the liquid crystal layer 78 at a location along the x-direction of the pixel selection 100 away from the pixel electrode 50 fingers. At depths closer to the lower alignment layer 76, which is non-planar because of the protrusions 108, the liquid crystal director azimuthal angle may increase to more than 84°, or more than one degree higher than the angle of the liquid crystal molecular alignment axis 110, which is here shown as 83°. At depths closer to the upper alignment layer 82, which is planar, the liquid crystal director azimuthal angle may converge to the angle of the liquid crystal molecular alignment axis 110, here shown as 83°.

Comparing the curve 126 to the curve 128 further suggests that the protrusions 108 are responsible for the deviation of the liquid crystal director azimuthal angle from the angle of the liquid crystal molecular alignment axis 110. In particular, it should be recalled that the curve 126 represents a location in the x-direction in the liquid crystal layer 78 that is near to the protrusions 108 and the curve 128 represents a location in the x-direction in the liquid crystal layer 78 that is further from the protrusions 108. The modeled liquid crystal director azimuthal angle is shown to deviate more in the curve 126 (nearer to the protrusions 108) than the curve 128 (further from the protrusions 108).

Figure 8:
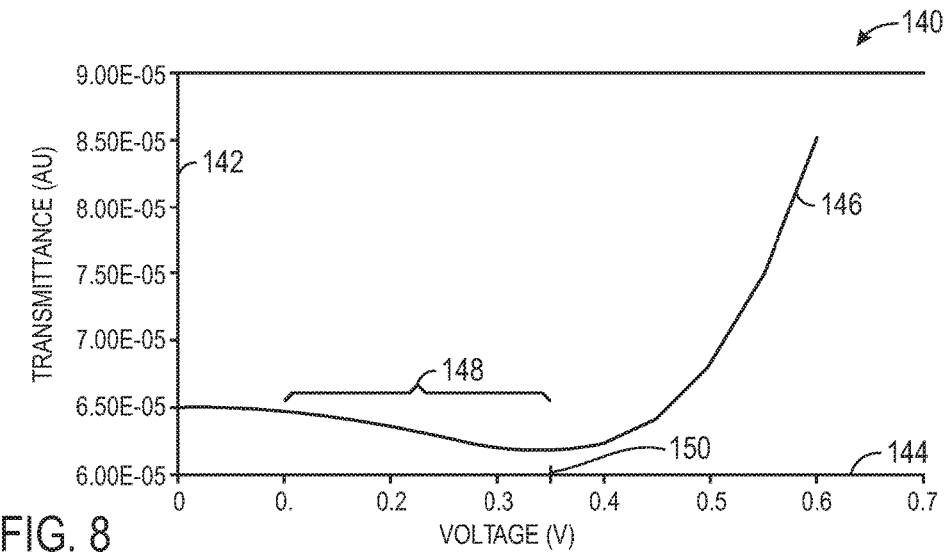
FIG. 8 is a plot modeling transmittance of a pixel as a function of voltage, in accordance with aspects of the present disclosure.

These deviations in the liquid crystal director azimuthal angle are believed to induce retardation for light polarized along or perpendicular to the liquid crystal molecular alignment axis 110 direction, causing significant light leakage in the dark state for on-axis light. Regardless of the cause, certain LCD panels may exhibit gray inversion of a manner illustrated in FIG. 8. That is, as shown by a plot 140 of FIG. 8 modeling transmittance through a pixel 42 as a function of gray scale voltage, such transmittance may initially drop as a function of voltage instead of increasing monotonically. This gray inversion effect may also result in reduced contrast because the lowest gray level voltages would allow for greater transmittance than a true transmittance minimum through the pixel 42.

The plot 140 includes an ordinate 142 representing transmittance in units of absorbance units (AU) and an abscissa 144 representing gray scale voltage in units of volts (V). In the plot 140, the abscissa 144 is modeled as beginning at 0V because the display 18 is modeled as being capable of supplying 0V to the pixel electrodes 50. However, it should be understood that other embodiments may have other minimum voltages that such other embodiments may be capable of providing.

A curve 146 represents transmittance through a pixel 42 as a function of the gray scale voltage. As can be seen, gray inversion 148 takes place as the voltage initially increases from the minimum voltage the display 18 is capable of providing. At a point 150, the transmittance reaches a true transmittance minimum before the transmittances begins to increase monotonically. This gray inversion 148 may be problematic because pixels 42 of the display 18 at a given gray scale level voltage may be lighter than pixels 42 at a higher gray scale level voltage (e.g., G0 may be lighter than G3).

Figure 9:
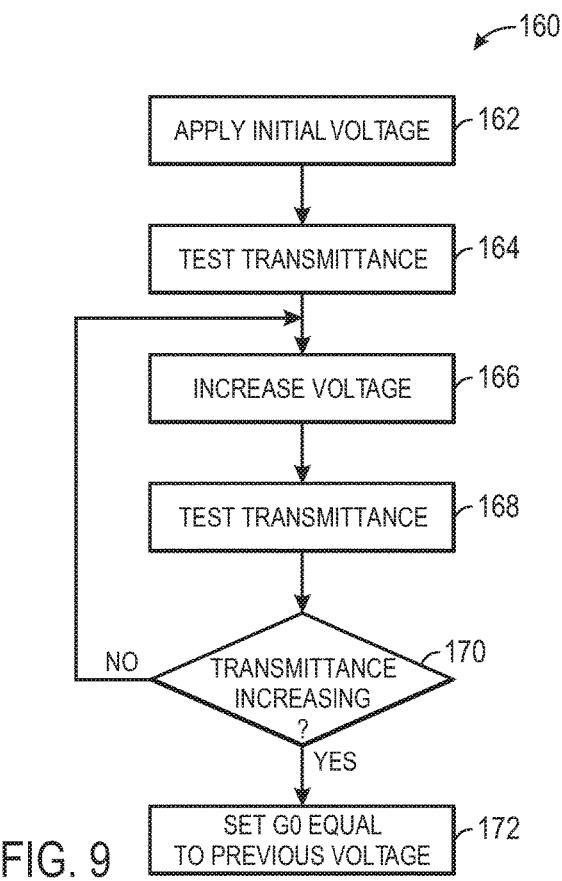
FIGS. 9 and 10 are flowcharts describing embodiments of methods for enabling a high contrast LCD panel by selecting a gray level 0 voltage near to a transmittance minimum.
Figure 10:
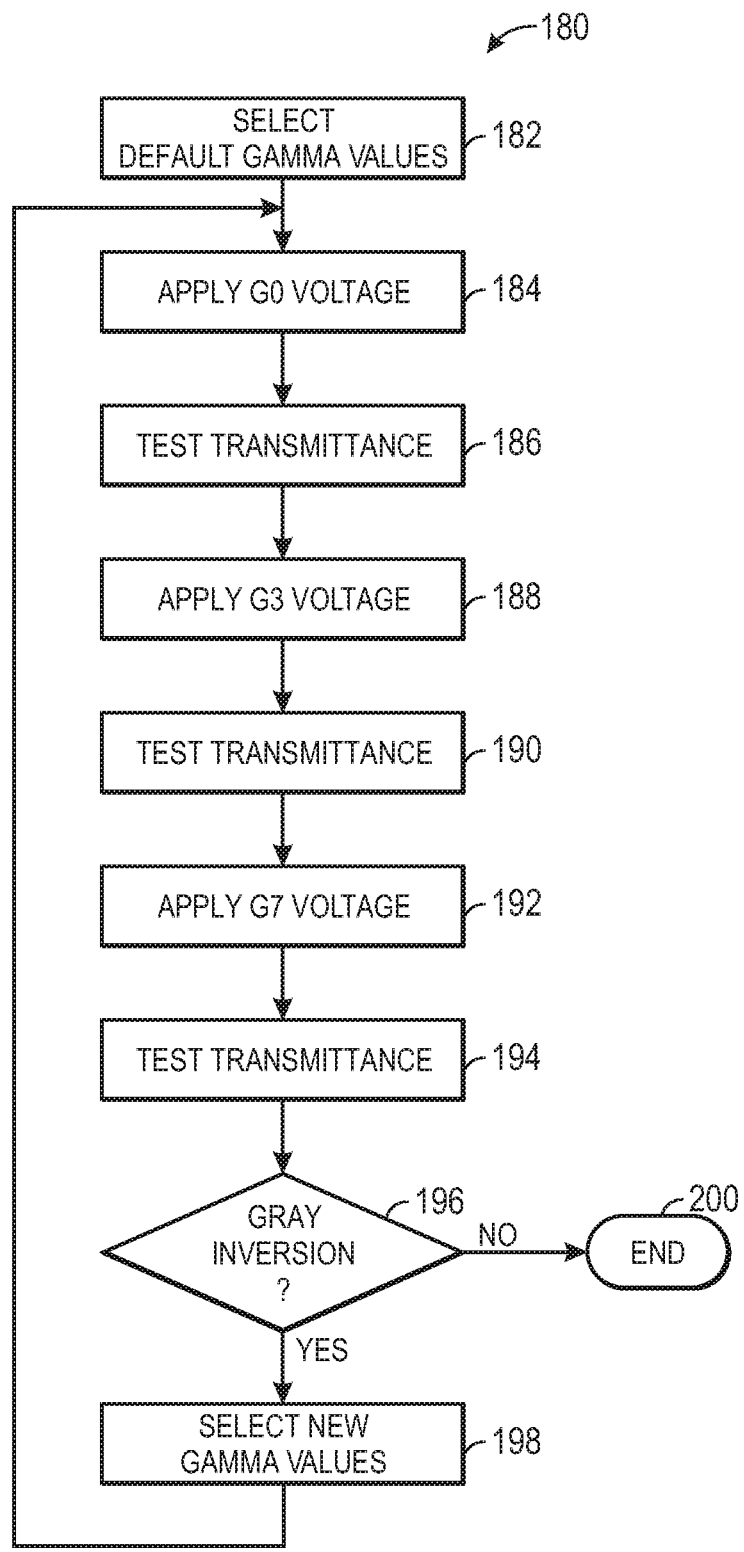

The gray inversion 148 may also impact the contrast ratio of the display 18, as the lowest gray scale level voltage may not be set to the true transmittance minimum 150 of the display 18. As such, FIGS. 9 and 10 present flowcharts of embodiments of methods for producing a high-contrast display 18 by selecting a gray scale level 0 voltage (G0) at a point at or near the true transmittance minimum 150. Thus, the transmittance of the display 18 may increase monotonically with the gray scale level voltages.

Turning to FIG. 9, a flowchart 160 represents an embodiment of a method for selecting a gray scale level 0 voltage (G0) that results in a high-contrast for the display 18. The flowchart 160 may begin when an initial voltage is applied to pixel electrodes 50 of pixels 42 of the display 18 (block 162). The resulting transmittance of these pixels may be tested using any suitable light metering device (block 164). The voltage currently applied to the pixel electrodes 50 may be increased (block 166) before the transmittance of the pixels 42 is tested once more (block 168).

Next, the transmittances associated with the original and increased voltages may be compared, and if the transmittance is not increasing with voltage (decision block 170), it may be understood that gray inversion is occurring. Thus, the voltage applied to the pixel electrodes 50 may again be increased (block 166) and the transmittance of the pixels 42 may be tested once more (block 168). This process may repeat until the transmittance is no longer increasing (decision block 170), at which point it may be understood that the previous voltage may approximate the true transmittance minimum 150. Also, it may be understood that the transmittance as a function of the voltage applied to the pixel electrodes 50 may be monotonic from that voltage forward. Thus, the gray scale level 0 voltage (G0) may be set equal to that previous voltage.

Another manner of determining the gray scale level 0 voltage (G0) may involve testing one or more defined gamma settings for gray scale inversion. As shown by a flowchart 180 of FIG. 10, the display 18 may be calibrated first by causing the display 18 to operate according to a default gamma setting (block 182). This default gamma setting may define the various gray scale level voltages (e.g., for an 8-bit gray scale, G0-G255). Then, certain low gray scale level voltages may be applied to the pixel electrodes 50 of pixels 42 of the display 18 and the resulting transmittances tested. For example, the G0, G3, and G7 voltages may be applied to pixel electrodes 50 of the pixels 42 of the display 18, and transmittances that result may be tested in any suitable manner (blocks 184-194).

If the G3 voltage produces a lower transmittance than the G0 voltage or the G7 voltage produces a lower transmittance than the G0 or G3 voltage, the display 18 may be exhibiting gray inversion, presumably for the reasons discussed above. If such gray inversion is determined to be occurring (decision block 196), a new gamma setting for the display 18 may instead be selected (block 198). Such a new gamma setting generally may involve a value of the gray scale level 0 voltage (G0) higher than the G0 of the previous gamma setting. Indeed, the increased voltage may equal or exceed 0.2 V, and in some cases, may equal or exceed 0.3 V (e.g., so as to reach a true transmittance minimum 150 as in FIG. 7).

Having selected a new gamma setting, certain low gray scale level voltages again may be applied to the pixel electrodes 50 of pixels 42 of the display 18 and the resulting transmittances tested (blocks 184-194). If gray inversion is still occurring (decision block 196), still another gamma setting may be selected (block 198). This process may repeat until gray inversion is no longer occurring (decision block 196), in which case the flowchart 180 may end 200. When the flowchart 180 ends 200, the selected gamma setting may produce a monotonic gray scale without gray scale inversion.

While the techniques discussed above with reference to FIGS. 9 and 10 may correct for gray scale inversion occurring in the display 18, the embodiments disclosed below may reduce such gray scale inversion or prevent it from occurring in the first place, as well as improve on-axis contrast. As noted above, it is widely accepted as conventional knowledge that the polarizing layers 66 and 68 should be respectively parallel or perpendicular to the liquid crystal molecular alignment axis 110, depending on the mode of operation of the display 18. However, the inventors propose that this conventional knowledge is incorrect. Indeed, as discussed further below, the inventors propose that on-axis contrast may be improved and/or gray scale inversion reduced or eliminated by offsetting the axis of the upper polarizing layers 66 and/or the axis of the lower polarizing layer 68 by some angle from the liquid crystal molecular alignment axis 110 of the lower and upper alignment layers 76 and 82. Additionally or alternatively, some embodiments may involve offsetting the liquid crystal molecular alignment axis 110 of the lower alignment layer 76 from the liquid crystal molecular alignment axis 110 of the upper alignment layer 82 by some angle. It is believed that offsetting the axes of the polarizing layers 66 and/or 68 and/or liquid crystal molecular alignment axes 110 may account for distortion that may result from the non-planar nature of the lower alignment layer 76 (e.g., as caused the protrusions 108).

Specifically, the surface topography of the lower alignment layer 76 is non-planar, and thus asymmetric with the upper alignment layer 82, because of the protrusions 108 caused by the fingers of the pixel electrode 50. As a result of this asymmetric alignment condition, the liquid crystal director of the liquid crystal layer 78 is believed not to be uniformly aligned along the liquid crystal molecular alignment axis 110 throughout the pixel 42, but rather may deviate from top to bottom as it approaches the pixel electrode 50 (e.g., as modeled in FIG. 6). These deviations are believed to induce retardation for light polarized along or perpendicular to the liquid crystal molecular alignment axis 110 direction. Since, for example, linearly polarized propagating through a slightly twisted liquid crystal structure could experience phase retardation and become elliptically polarized, such light passing through an uncorrected pixel 42 may escape the upper polarizing layer 66. Although this effect may be very small, it should be noted that the dark state transmittance of the gray scale level 0 voltage (G0) is also very small, and even the smallest changes could reduce the contrast ratio significantly. In such cases, the techniques of FIGS. 9 and 10 alone may reduce or eliminate gray inversion, but may not be able to maximize the on-axis contrast ratio.

Figure 11:
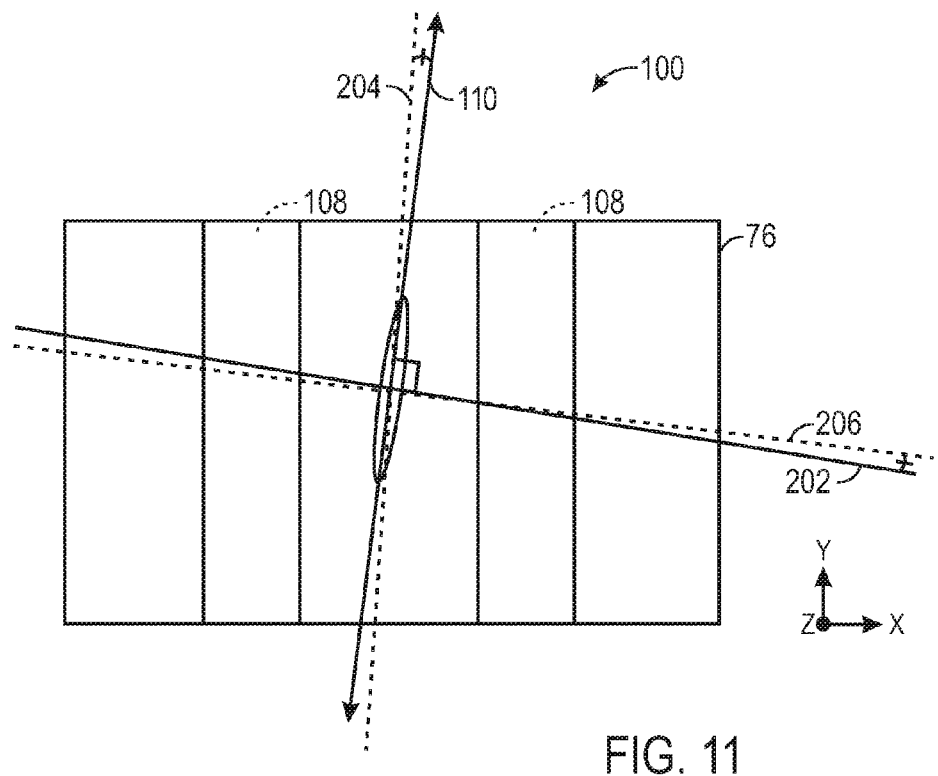
FIG. 11 is a schematic diagram of a pixel having polarizer offset from the liquid crystal molecular alignment axis to improve monotonicity of gray level voltages, in accordance with aspects of the present disclosure.

Accordingly, as shown in FIG. 11, the axis of the upper polarizing layer 66 and/or the axis of the lower polarizing layer 68 may be offset slightly from their conventional perpendicular or parallel configuration with the liquid crystal molecular alignment axis 110. Specifically, the liquid crystal molecular alignment axis 110 may be determined using any suitable method. Here, the liquid crystal molecular alignment axis 110 has been determined to be 83°. One or both of the upper and lower polarizing layer 66 and/or 68 axes then may be offset from their conventional configuration relative to the liquid crystal molecular alignment axis 110.

For example, FIG. 11 represents an O-mode configuration, in which the axis 204 of the lower polarizing layer 68 may be offset from being parallel to the liquid crystal molecular alignment axis 110 by a certain amount, and may be determined through experimentation and/or simulation, and may represent an angle at which the least amount of light is transmitted through the pixel 42 at the lowest gray scale level voltage the display 18 is capable of providing. In some embodiments, the axis 204 of the lower polarizing layer 68 may be offset by a relatively small amount such as between 0.3° and 1°, but which may be smaller or larger as determined through experimentation and simulation. The angle of the axis 204 may be offset in a direction toward parallel to an axis of the fingers of the pixel electrode 50 (e.g., closer to 90°). As illustrated, the axis 204 of the lower polarizing layer 68 may have an angle of approximately 83.3°.

In some embodiments, rather than be perpendicular 202 with the liquid crystal molecular alignment axis 110, the axis 206 of the upper polarizing layer 66 may also be offset from being perpendicular 202 with the liquid crystal molecular alignment axis 110. The offset angle of the axis 206 may be determined through experimentation and/or simulation, and may represent an angle at which the least amount of light is transmitted through the pixel 42 at the lowest gray scale level voltage the display 18 is capable of providing. In some embodiments, the axis 206 of the upper polarizing layer 66 may be offset by a relatively small amount such as between 0.3° and 1°, but which may be smaller or larger as determined through experimentation and simulation. The angle of the axis 206 may be offset in a direction toward perpendicular to an axis of the fingers of the pixel electrode 50 (e.g., closer to 0°). As illustrated, the axis 204 of the lower polarizing layer 68 may have an angle of approximately −16.7°. While the offset angles of the axes 204 and 206 are illustrated as being the same, in some embodiments, the offset angles may be different based on experimentation and simulation.

In the embodiment of FIG. 11, both the axis 204 of the lower polarizing layer 68 and the axis 206 of the upper polarizing layer 66 may be offset from the liquid crystal molecular alignment axis 110. In alternative embodiments, only one of these axes 204 or 206 may be offset from their default configurations depending on the mode of operation (e.g., O-mode or E-mode). Also, while the embodiment of FIG. 11 relates to a configuration for O-mode display 18 operation, other embodiments may relate to configurations for E-mode. For example, the axis 204 of the lower polarizing layer 68 may be offset by some angle from the being perpendicular 202 with the liquid crystal molecular alignment axis 110 by some angle, and/or the axis 206 of the upper polarizing layer 66 may be offset by some angle from being parallel with the liquid crystal molecular alignment axis 110.

Figure 12:
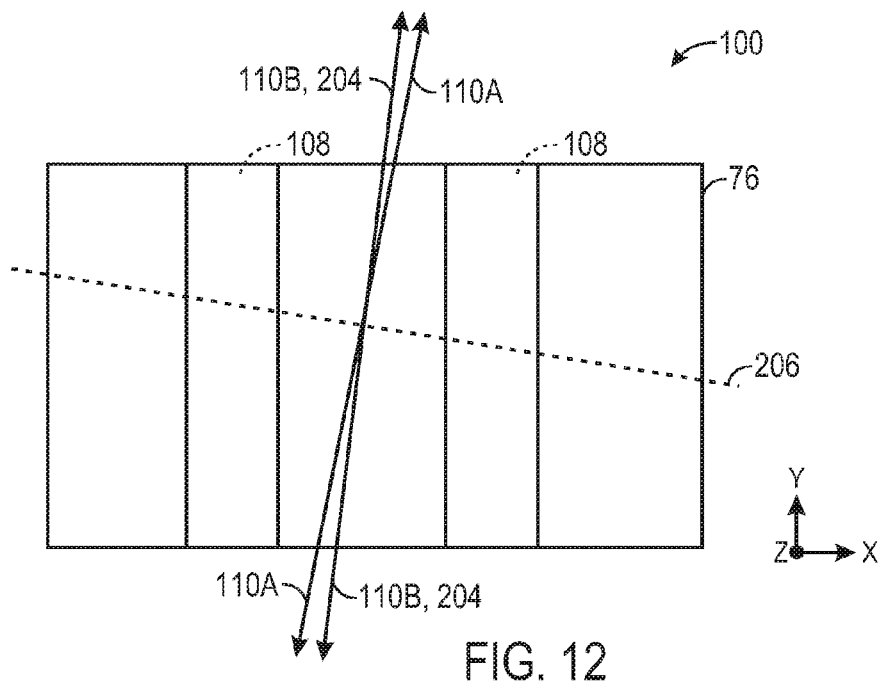
FIG. 12 is a schematic diagram of a pixel having offset top and bottom liquid crystal molecular alignment axis to improve monotonicity of gray level voltages, in accordance with aspects of the present disclosure.

In addition or alternatively to the embodiments discussed above with reference to FIGS. 9 and 10 and those discussed above with reference to FIG. associated with FIG. 11, gray scale level inversion may be reduced or eliminated and on-axis contrast may be improved by offsetting the liquid crystal molecular alignment axes 110 of the lower alignment layer 76 and the upper alignment layer 82. As shown in FIG. 12, a lower liquid crystal molecular alignment axis 110A associated with the lower alignment layer 76 may be offset from an upper liquid crystal molecular alignment axis 110B associated with the upper alignment layer 82. In particular, the upper liquid crystal molecular alignment axis 110B, being relatively distant from the protrusions 108 of the lower alignment layer 76, may be determined in any suitable manner. As illustrated in FIG. 12, the angle of the upper liquid crystal molecular alignment axis 110B is approximately 83°. Since FIG. 12 illustrates an O-mode configuration, the axis 204 of the lower polarizing layer 68 is parallel to the upper liquid crystal molecular alignment axis 110B, while the axis 206 of the upper polarizing layer 66 is perpendicular to the upper liquid crystal molecular alignment axis 110B.

The lower liquid crystal molecular alignment axis 110A associated with the lower alignment layer 76 may be offset from the upper liquid crystal molecular alignment axis 110B associated with the upper alignment layer 82 by some angle. In other words, the lower liquid crystal molecular alignment axis 110A is not merely 180° different from the upper liquid crystal molecular alignment axis 110B, but rather may be offset by some angle, e.g., less than or more than a multiple of 180°. The offset angle may be determined by experimentation and/or simulation, and may represent an angle at which the least amount of light is transmitted through the pixel 42 at the lowest gray scale level voltage the display 18 is capable of providing. In some embodiments, the lower liquid crystal molecular alignment axis 110A may be offset from the upper liquid crystal molecular alignment axis 110B by a relatively small amount, such as between 0.3° and 1°. This offset angle may be smaller or larger, depending the results of experimentation and/or simulation. In some embodiments, as illustrated by FIG. 12, the lower liquid crystal molecular alignment axis 110A may be offset from the upper liquid crystal molecular alignment axis 110B in a direction toward perpendicular to an axis of the fingers of the pixel electrode 50 (e.g., closer to 0°). As illustrated, lower liquid crystal molecular alignment axis 110A may have an angle of approximately 82.7°.

While the embodiment of FIG. 12 relates to a configuration for O-mode display 18 operation, other embodiments may relate to configurations for E-mode operation. For example, the axis 204 of the lower polarizing layer 68 may be parallel with the upper liquid crystal molecular alignment axis 110B, and the axis 206 of the upper polarizing layer 66 may be perpendicular to the upper liquid crystal molecular alignment axis 110B.

It should be understood that the embodiments described above with reference to FIGS. 11 and 12 may be combined. That is, one or both of the axes 204 and 206 of the lower and upper polarizing layers 68 and 66 may be offset by some angle from their default configurations with the upper liquid crystal molecular alignment axis 110B, even while the lower liquid crystal molecular alignment axis 110A is offset by some angle from the upper liquid crystal molecular alignment axis 110B.

Figure 13:
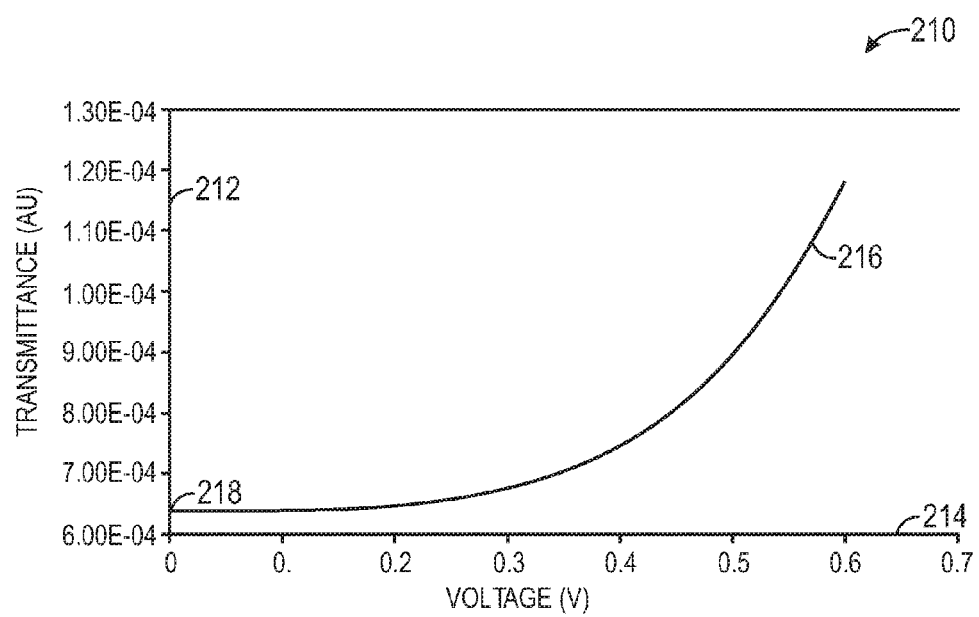
FIG. 13 is a plot modeling the transmittance of a pixel of FIG. 11 or 12 as a function of gray level voltage, in accordance with aspects of the present disclosure.

Depending on the size and effect of the protrusions 108, the embodiments associated with FIGS. 11 and 12 may result in a monotonic function of pixel 42 transmittance and gray scale voltage, represented by a plot 210 of FIG. 13. In the plot 210, an ordinate 212 represents transmittance in units of absorbance units (AU) and an abscissa 214 represents gray scale voltage in units of volts (V). The abscissa 210 is modeled as beginning at 0V because the display 18 is modeled as being capable of supplying 0V to the pixel electrodes 50. However, it should be understood that other embodiments may have other minimum voltages that such other embodiments may be capable of providing.

A curve 216 represents transmittance of light through a pixel 42 as a function of the gray scale voltage. As can be seen from the curve 216, the transmittance as a function of gray scale voltage is substantially monotonic. As such, a true transmittance minimum 218 may begin at the minimum voltage the display 18 is capable of providing. On the other hand, if gray scale inversion does occur in embodiments associated with FIGS. 11 and/or 12, and the transmittance of light through a pixel 42 as a function of gray scale voltage is not monotonic, the gray scale level 0 voltage (G0) may be selected in a manner such as discussed above with reference to FIGS. 9 and 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
   a liquid crystal display having a plurality of pixels with a liquid crystal material disposed between two liquid crystal alignment layers not symmetric to one another, and having upper and lower polarizing layers respectively above and below the two liquid crystal alignment layers, wherein light transmittance through the plurality of pixels increases monotonically as gray scale voltages increase and wherein:
   the liquid crystal display is configured to operate using a gray scale level 0 voltage that is higher than a minimum gray scale level 0 voltage capability of the liquid crystal display; or
   liquid crystal molecular alignment axes of the two liquid crystal alignment layers are offset from one another by an offset angle other than a multiple of 180 degrees; or
   at least one of a first polarizing axis associated with the upper polarizing layer and a second polarizing axis associated with the lower polarizing layer is substantially nonparallel and substantially non-perpendicular to one of the liquid crystal molecular alignment axes of the two liquid crystal alignment layers to prevent or reduce gray scale inversion, wherein gray scale inversion causes light transmittance not to increase monotonically with all gray scale voltages, that would otherwise occur if the at least one of the first polarizing axis and the second polarizing axis were parallel or perpendicular to the first liquid crystal molecular alignment axis or the second liquid crystal molecular alignment axis; or
   any combination thereof,
   wherein the at least one of the first polarizing axis and the second polarizing axis substantially non-parallel and substantially non-perpendicular to the first liquid crystal molecular alignment axis or the second liquid crystal molecular alignment axis is offset from being parallel or perpendicular to the first liquid crystal molecular alignment axis or the second liquid crystal molecular alignment axis by an angle configured to cause the pixel to transmit a reduced amount of light in the absence of an electric field than that which would be transmitted by the pixel if both the first polarizing axis and the second polarizing axis were parallel or perpendicular to the first liquid crystal molecular alignment axis and the second liquid crystal molecular alignment axis in the absence of the electric field.

2. The electronic device of claim 1, wherein at least one of the two liquid crystal alignment layers of the liquid crystal display is substantially non-planar.

3. The electronic device of claim 1, wherein a first of the two liquid crystal alignment layers of the liquid crystal display is substantially planar and a second of the two liquid crystal alignment layers of the liquid crystal display is substantially non-planar, wherein a liquid crystal director azimuthal angle of the liquid crystal material is substantially aligned to a first liquid crystal molecular alignment axis associated with the first of the two liquid crystal alignment layers but is misaligned to a second liquid crystal molecular alignment axis associated with the second of the two liquid crystal alignment layers.

4. An electronic display comprising:
   a pixel comprising:
   a lower polarizing layer configured to polarize light on a first polarizing axis;
   a lower liquid crystal alignment layer disposed above the lower polarizing layer and configured to generally align liquid crystal molecules along a first liquid crystal molecular alignment axis in the absence of an electric field;
   liquid crystal layer disposed above the lower liquid crystal alignment layer that includes the liquid crystal molecules;
   an upper liquid crystal alignment layer disposed above the liquid crystal layer and configured to generally align liquid crystal molecules along a second liquid crystal molecular alignment axis in the absence of an electric field, wherein the second liquid crystal molecular alignment axis is equal to or 180 degrees different from the first liquid crystal molecular alignment axis; and
   an upper polarizing layer disposed above the upper liquid crystal alignment layer and configured to polarize light on a second polarizing axis;
   wherein at least one of the first polarizing axis and the second polarizing axis is substantially non-parallel and substantially non-perpendicular to the first liquid crystal molecular alignment axis or the second liquid crystal molecular alignment axis to prevent or reduce gray scale inversion, wherein gray scale inversion causes light transmittance not to increase monotonically with all gray scale voltages, that would otherwise occur if the at least one of the first polarizing axis and the second polarizing axis were parallel or perpendicular to the first liquid crystal molecular alignment axis or the second liquid crystal molecular alignment axis,
   wherein the at least one of the first polarizing axis and the second polarizing axis substantially non-parallel and substantially non-perpendicular to the first liquid crystal molecular alignment axis or the second liquid crystal molecular alignment axis is offset from being parallel or perpendicular to the first liquid crystal molecular alignment axis or the second liquid crystal molecular alignment axis by an angle configured to cause the pixel to transmit a reduced amount of light in the absence of an electric field than that which would be transmitted by the pixel if both the first polarizing axis and the second polarizing axis were parallel or perpendicular to the first liquid crystal molecular alignment axis and the second liquid crystal molecular alignment axis in the absence of the electric field.

5. The electronic display of claim 4, wherein the at least one of the first polarizing axis and the second polarizing axis substantially non-parallel and substantially non-perpendicular to the first liquid crystal molecular alignment axis or the second liquid crystal molecular alignment axis is offset from being parallel or perpendicular to the first liquid crystal molecular alignment axis or the second liquid crystal molecular alignment axis by an angle less than five degrees.

6. The electronic display of claim 4, wherein the at least one of the first polarizing axis and the second polarizing axis substantially non-parallel and substantially non-perpendicular to the first liquid crystal molecular alignment axis or the second liquid crystal molecular alignment axis is offset from being parallel or perpendicular to the first liquid crystal molecular alignment axis or the second liquid crystal molecular alignment axis by an angle of greater than 0.3 degrees and less than 1 degree.

7. The electronic display of claim 4, wherein the lower liquid crystal alignment layer comprises protrusions into the liquid crystal layer and wherein, when the liquid crystal display is configured to operate in an O-mode, the first polarizing axis is offset from being parallel to the first liquid crystal molecular alignment axis or the second liquid crystal molecular alignment axis in a direction toward being more parallel to the protrusions.

8. The electronic display of claim 4, wherein the lower liquid crystal alignment layer comprises protrusions into the liquid crystal layer and wherein, when the liquid crystal display is configured to operate in an O-mode, the second polarizing axis is offset from being perpendicular to the first liquid crystal molecular alignment axis or the second liquid crystal molecular alignment axis in a direction toward being more perpendicular to the protrusions.

9. The electronic display of claim 4, wherein the lower liquid crystal alignment layer comprises protrusions into the liquid crystal layer and wherein, when the liquid crystal display is configured to operate in an E-mode, the first polarizing axis is offset from being perpendicular to the first liquid crystal molecular alignment axis or the second liquid crystal molecular alignment axis in a direction toward being more perpendicular to the protrusions.

10. The electronic display of claim 4, wherein the lower liquid crystal alignment layer comprises protrusions into the liquid crystal layer and wherein, when the liquid crystal display is configured to operate in an E-mode, the second polarizing axis is offset from being parallel to the first liquid crystal molecular alignment axis or the second liquid crystal molecular alignment axis in a direction toward being more parallel to the protrusions.

11. The electronic display of claim 4, wherein the lower liquid crystal alignment layer and the upper liquid crystal alignment layer are asymmetric.

12. A liquid crystal display comprising: a pixel comprising:
a first liquid crystal alignment layer having a first liquid crystal molecular alignment axis;
a second liquid crystal alignment layer having a second liquid crystal molecular alignment axis, wherein the second liquid crystal molecular alignment axis is offset from the first liquid crystal molecular alignment axis by an offset angle other than a multiple of 180 degrees to prevent or reduce gray scale inversion, wherein gray scale inversion causes light transmittance not to increase monotonically with all gray scale voltages, that would otherwise occur if the second liquid crystal molecular alignment axis were not offset from the first liquid crystal molecular alignment axis by an offset angle other than a multiple of 180 degrees; and
a liquid crystal layer disposed between the first liquid crystal alignment layer and the second liquid crystal alignment layer;
wherein the first liquid crystal alignment layer or the second liquid crystal alignment layer, or a combination thereof, are at least partially non-planar, wherein the at least one of the first polarizing axis and the second polarizing axis substantially non-parallel and substantially non-perpendicular to the first liquid crystal molecular alignment axis or the second liquid crystal molecular alignment axis is offset from being parallel or perpendicular to the first liquid crystal molecular alignment axis or the second liquid crystal molecular alignment axis by an angle configured to cause the pixel to transmit a reduced amount of light in the absence of an electric field than that which would be transmitted by the pixel if both the first polarizing axis and the second polarizing axis were parallel or perpendicular to the first liquid crystal molecular alignment axis and the second liquid crystal molecular alignment axis in the absence of the electric field.

13. The display of claim 12, wherein the first liquid crystal alignment layer or the second liquid crystal alignment layer, or a combination thereof, includes a plurality of protrusions into the liquid crystal layer.

14. The display of claim 13, wherein the plurality of protrusions are due to fingers of pixel electrodes or a common electrode beneath the first liquid crystal alignment layer or the second liquid crystal alignment layer, or the combination thereof.

15. The display of claim 12, wherein the first liquid crystal alignment layer is substantially planar and wherein the pixel comprises a first polarizing layer having an axis substantially perpendicular or substantially parallel to the first liquid crystal molecular alignment axis.

16. The display of claim 12, wherein the second liquid crystal molecular alignment axis is offset from the first liquid crystal molecular alignment axis by an angle of less than or equal to 1°.

17. The display of claim 12, wherein the second liquid crystal molecular alignment axis is offset from the first liquid crystal molecular alignment axis by an angle of greater than or equal to 0.3°.

18. A method for manufacturing a liquid crystal display comprising:
providing a lower polarizing layer having a first polarizing axis;
providing a lower liquid crystal alignment layer having a first liquid crystal alignment axis, wherein the lower liquid crystal alignment layer is disposed over the lower polarizing layer;
providing a liquid crystal material disposed over the lower liquid crystal alignment layer;
providing an upper liquid crystal alignment layer having a second liquid crystal alignment axis, wherein the lower liquid crystal alignment layer is disposed over the liquid crystal material; and
providing an upper polarizing layer having a second polarizing axis, wherein the upper polarizing layer is disposed over the upper liquid crystal alignment layer;
wherein:
the first liquid crystal alignment axis is targeted to form a first offset angle that is substantially non-parallel and non-perpendicular to the first polarizing axis, the second polarizing axis, or both to prevent or reduce gray scale inversion, wherein gray scale inversion causes light transmittance not to increase monotonically with all gray scale voltages, that would otherwise occur if the at least one of the first polarizing axis and the second polarizing axis were parallel or perpendicular to the first liquid crystal molecular alignment axis or the second liquid crystal molecular alignment axis; or the second liquid crystal alignment axis is targeted to form a second offset angle that is substantially non-parallel and non-perpendicular to the first polarizing axis, the second polarizing axis, or both;

or a combination thereof, wherein the at least one of the first polarizing axis and the second polarizing axis substantially non-parallel and substantially non-perpendicular to the first liquid crystal molecular alignment axis or the second liquid crystal molecular alignment axis is offset from being parallel or perpendicular to the first liquid crystal molecular alignment axis or the second liquid crystal molecular alignment axis by an angle configured to cause the pixel to transmit a reduced amount of light in the absence of an electric field than that which would be transmitted by the pixel if both the first polarizing axis and the second polarizing axis were parallel or perpendicular to the first liquid crystal molecular alignment axis and the second liquid crystal molecular alignment axis in the absence of the electric field.

19. A method for manufacturing a liquid crystal display comprising:

providing a polarizing layer having a polarizing axis at a first angle; and providing a liquid crystal alignment layer, wherein the liquid crystal alignment layer has a molecular alignment axis targeted to a second angle that is substantially non-parallel and non-perpendicular to the first angle to prevent or reduce gray scale inversion, wherein gray scale inversion causes light transmittance not to increase monotonically with all gray scale voltages, that would otherwise occur if the second angle were substantially parallel or perpendicular to the first angle, wherein the at least one of the first polarizing axis and the second polarizing axis substantially non-parallel and substantially non-perpendicular to the first liquid crystal molecular alignment axis or the second liquid crystal molecular alignment axis is offset from being parallel or perpendicular to the first liquid crystal molecular alignment axis or the second liquid crystal molecular alignment axis by an angle configured to cause the pixel to transmit a reduced amount of light in the absence of an electric field than that which would be transmitted by the pixel if both the first polarizing axis and the second polarizing axis were parallel or perpendicular to the first liquid crystal molecular alignment axis and the second liquid crystal molecular alignment axis in the absence of the electric field.

* * * * *

UNITED STATES PATENT AND TRADEMARK OFFICE
CERTIFICATE OF CORRECTION

PATENT NO. : 10,108,049 B2
APPLICATION NO. : 12/794623
DATED : October 23, 2018
INVENTOR(S) : EnkhAmgalan Dorjgotov et al.

It is certified that error appears in the above-identified patent and that said Letters Patent is hereby corrected as shown below:

In the Claims

Column 15, Line 53, replace "the first" with --a first--.
Column 15, Line 54, replace "the second" with --a second--.
Column 15, Line 65, replace "the pixel" with --the plurality of pixels--.
Column 15, Line 67, replace "the pixel" with --the plurality of pixels--.

Column 16, Line 14, replace "a first" with --the first--.
Column 16, Line 16, replace "a second" with --the second--.
Column 16, Line 28, insert --a-- before "liquid".
Column 16, Line 33, insert --the-- between "align" and "liquid".
Column 16, Line 34, replace "an" with --the--.
Column 16, Line 64, replace "an" with --the--.

Column 18, Line 9, delete "the" between "wherein" and "at".
Column 18, Line 10, replace "the first" with --a first--.
Column 18, Line 10, replace "the second" with --a second--.
Column 18, Line 52, insert --molecular-- between "crystal" and "alignment".
Column 18, Line 58, insert --molecular-- between "crystal" and "alignment".
Column 18, Line 65, insert --molecular-- between "crystal" and "alignment".

Column 19, Line 10, insert --molecular-- between "crystal" and "alignment".

Column 20, Line 14, delete "the" between "wherein" and "at".
Column 20, Line 14, replace "the first" with --a first--.
Column 20, Lines 14-15, replace "the second" with --a second--.
Column 20, Line 16, replace "the first" with --a first--.
Column 20, Line 17, replace "the second" with --a second--.
Column 20, Line 21, replace "the pixel" with --a pixel--.

Signed and Sealed this
Twentieth Day of October, 2020

Andrei Iancu
*Director of the United States Patent and Trademark Office*